Figure 1:
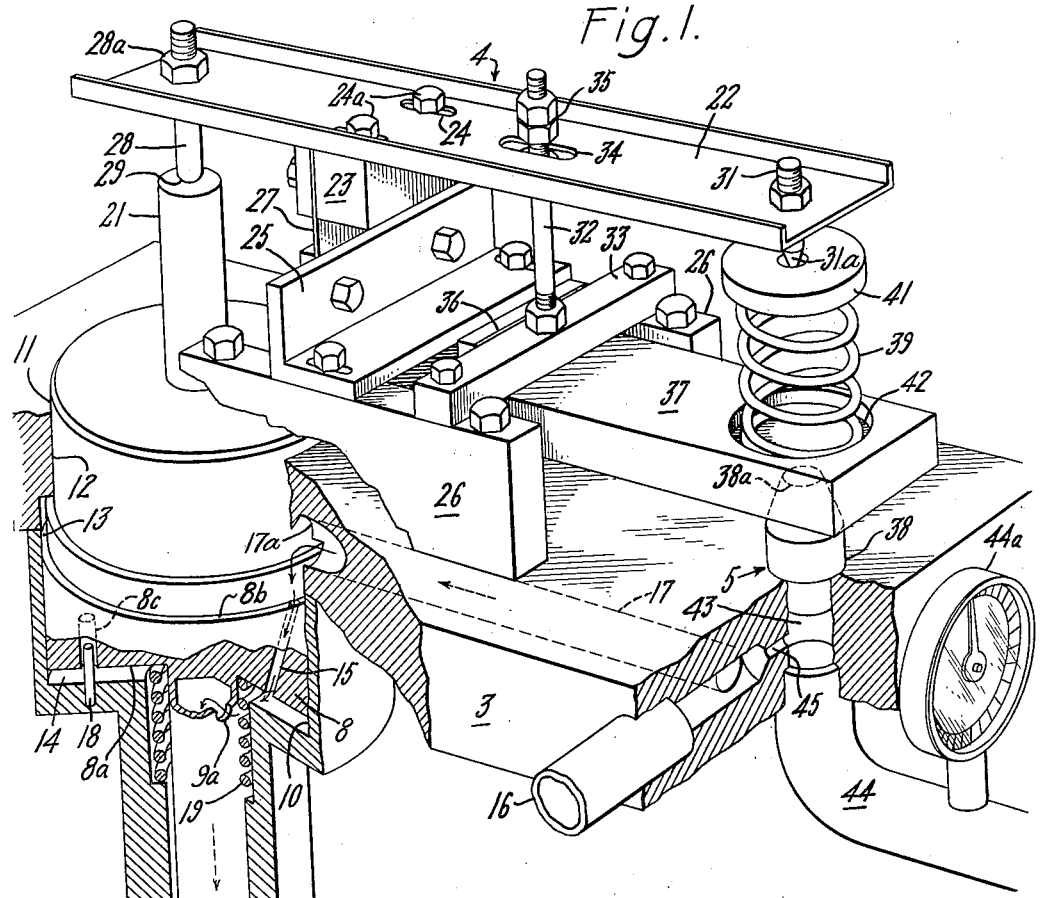

Oct. 3, 1961  S. JACOBS  3,002,374
HYDRAULIC THRUST BEARING WEAR INDICATOR
Filed Jan. 19, 1960

INVENTOR
STEPHEN JACOBS
BY W. C. Crutcher
HIS ATTORNEY

United States Patent Office 3,002,374
Patented Oct. 3, 1961

3,002,374
HYDRAULIC THRUST BEARING WEAR INDICATOR
Stephen Jacobs, Lunenburg, Mass., assignor to General Electric Company, a corporation of New York
Filed Jan. 19, 1960, Ser. No. 3,307
4 Claims. (Cl. 73—37.5)

This invention relates to a thrust bearing wear indicator for determining the axial movement of a rotating member, and more particularly to a device for providing a hydraulic pressure signal which varies substantially linearly with axial movement of the rotating member.

It is important that an indication be given of excessive axial movement of a rotor resulting from thrust bearing wear, and devices have been suggested for providing a signal after a predetermined axial movement of the rotor. One such arrangement is disclosed in U.S. Patent No. 2,888,023, issued to Markus A. Eggenberger on May 26, 1959, and assigned to the assignee of the present application. It is desirable in some instances to have a continuous indication of the degree of wear so that a direct reading dial may be employed or so that signals may be given at various stages of wear. This is important where the total movement due to thrust bearing wear and clearance may be very small, i.e. on the order of only a few mils. Many arrangements have been advanced for accomplishing this, but a common fault lies in the inability of these devices to provide a signal which gives a greatly amplified indication of rotor movement and yet which varies linearly with the axial movement of the rotor. In these devices, the troublesome expedient of calibration is necessary before proper creditability can be given to the degree of wear shown on the indicating means.

Also, many of the prior art devices employ direct-contact followers on the rotor which are subject to wear and therefore are also of questionable accuracy.

Accordingly, it is an object of the present invention to provide an improved thrust bearing wear indicator which does not require direct contact with the rotor and which, at the same time, provides a continuous amplified remote indication of axial movement of the rotor.

Another object of the invention is to provide an improved mechanism to provide a hydraulic pressure signal which varies substantially linearly with the rotor axial movement.

Still another object is a thrust bearing wear indicator which provides an amplified hydraulic output signal of high accuracy under the control of a very small mechanical input movement.

Yet another object is to provide an improved thrust bearing wear indicator which gives an accurate measurement of the degree of thrust bearing wear at all times without having parts which are subject to wear.

Generally stated, the invention is practiced by providing a hydraulically positioned rotor follower which maintains a hydraulic "bleed" gap between the rotor and a movable probe by means of the hydraulic pressure difference on either side of a piston secured to the probe. Movement of the probe adjusts the spring bias on a flapper type bleed valve which is connected in parallel with an indicator and supplied with fluid through an orifice connected to a constant pressure source. The indicator pressure will be determined by very slight changes in flapper valve opening, and will vary substantially linearly with movement of the probe.

Referring now to FIG. 1 of the drawing, the hydraulic wear indicator employs a slidable follower 1 disposed in a housing 2 secured to a support block shown generally at 3. A lever mechanism, shown generally as 4, provides a variable bias for a bleed valve 5, both of which are mounted on the support block 3.

The indicator mechanism is arranged to be mounted in close proximity with a rotor member 6 having a circumferential flange 6a with a frusto-conical surface 6b formed therein. Thus, assuming the thrust bearing wear is such that rotor 6 moves in the direction of the arrow, the surface 6b will tend to close the gap between it and probe 1, as bearing wear increases.

The follower 1 is furnished with a hollow probe 7 having its end mitered at an angle as seen at 7a so as to correspond with the angle of frusto-conical surface 6b on the rotor. Probe 7 is attached to a piston 8 by a hollow connecting tube 9 having a hole 9a communicating with the interior of probe 7. The piston 8 slides in a bore 10 of the housing 2. The piston 8 also has an upper portion 11 of larger diameter than that of tube 9 which slides in a bore 12 cut in the support block 3. Pressure chambers 13 and 14 are thus formed on the top and bottom sides respectively of the piston 8 of the follower. A connecting restricted conduit 15 drilled through piston 8 allows a restricted flow of oil between chambers 13 and 14. An oil supply conduit 17 drilled longitudinally along support block 3 communicates with fluid chamber 13 at the top side of piston 8 by means of opening 17a. A supply of relatively high pressure oil, 100 p.s.i. for example, supplied by a pipe 16 leading to supply conduit 17, may thus flow through supply conduit 17 and through opening 17a into the fluid chamber 13 on the upper side of piston 8. A restricted flow of oil may then flow through the restricted conduit 15 to chamber 14 on the lower side of piston 8 and from there it enters the hollow tube 9 through hole 9a and flows through the hollow probe 7 to discharge through the mitered tip 7a.

A dowel pin 18 secured to the housing 2 and extending into a mating opening 8c in the bottom of piston 8 prevents rotation of piston 8 with respect to the housing so that the tip 7a of the probe will not rotate and become misaligned with the flange 6a of the rotor. For further protection of the probe tip, a spring 19 biases piston 8 away from the rotor flange 6a, so that the probe will be withdrawn upon loss of pressure in chambers 13, 14.

As thus described, the follower structure is similar to that described in the aforementioned Eggenberger patent. The exposed area of the bottom side 8a of piston 8 is larger than the exposed annular area of the top side 8b of piston 8 due to the fact that portion 11 on top of the piston, has a greater diameter than tube 9 on the bottom of the piston. Less pressure, however, acts on the lower side of piston 8 due to the fact that there is a pressure drop of the hydraulic fluid while passing through the restricted passageway 15. Piston 8 remains in an equilibrium position when the ratio between the pressures in chamber 13, 14 is inversely proportional to the ratio of the effective piston areas on the top 8b and on the bottom 8a of piston 8. Axial movement of the rotor 6 increases or decreases the gap between probe 7a and flange 6a which causes a pressure increase or decrease in lower chamber 14. Since the fluid undergoes two pressure drops, one through passageway 15 and another across the gap at probe tip 7a, and since the probe tip gap determines the pressure in lower chamber 14, the follower 1 will move to readjust the pressure ratio between chambers 13 and 14 and to restore the former value of the bleed gap between probe tip 7a and flange 6a, regardless of fluctuations in supply pressure. Thus the probe follows the movements of the flange 6a without actually engaging the flange or touching it in any way. This non-engaging probe is thus not subject to the wear and inaccuracies of some prior art devices where a roller or some such similar device directly engages the rotor.

An extension rod 21 attached to the top of portion 11 is utilized to transmit the movement of follower 1 to the lever mechanism 4. Lever mechanism 4 consists of a channel-shaped lever 22 fastened to a pivot block 23 by screws 24a. Adjustment slots 24 are provided for calibrating lever 22 by changing its fulcrum point by shifting its position on block 23. An angle piece 25 secured between two spacer blocks 26, which in turn are secured to support block 3, acts as a stationary pivot point for lever 22. With its respective end portions bolted to angle 25 and pivot block 23, is a thin piece of spring metal 27 which will readily flex to allow lever 22 to pivot. It will be appreciated that the amount of pivotal motion of lever 22 is very small, so that leaf spring 27 forms a substantially frictionless pivot support.

A rod 28 is threaded and secured by nut 28a to the left-hand end of lever 22 and has a rounded lower end portion 29 abutting the end surface of rod 21, so as to provide a relatively frictionless transfer of the movement of follower 1 to the lever 22. A similar rod 31 having a pointed end 31a is attached to the other end of lever 22.

To prevent overtravel of lever 22, a positive stop means is provided by a rod 32 secured to a cross member 33 bridging the spacer blocks 26. The rod extends through a slot 34 in lever 22, the slot being wide enough so as not to touch the sides of rod 32 as the lever moves. Nuts 35 provide a positive stop limiting upward or downward movement of lever 22.

Figure 2:
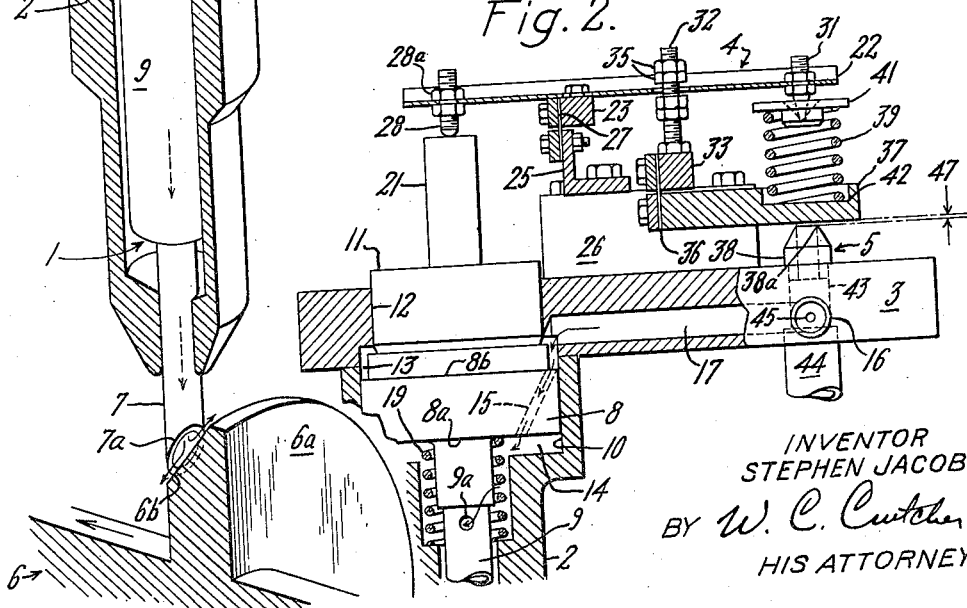

Also bolted to cross member 33 is another leaf spring 36 which is better seen by reference to FIG. 2. Leaf spring 36 provides a flexing pivot point for the bleed valve flapper member 37. Flapper member 37 cooperates on its smooth flat underside with a carefully dimensioned bleed discharge nozzle 38 which is securely held in the support block 3. Flapper 37 is suspended from leaf spring 36 in such a way that when the undersurface of flapper 37 forms a clearance of about .002 inch to .003 inch with nozzle 38, the undersurface will be normal to the axis of the nozzle.

A compression spring 39 of known spring constant and having an accurate characteristic is held in place between a washer 41 and a recessed seat 42 defined by the flapper member 37. Thus the movement of rod 28 on the left-hand end of lever 22 will adjust the bias of spring 39 by moving the pointed abutment end member 31a toward or away from flapper member 37. Leaf spring 36 also holds flapper 37 so that it is normal to the axis of spring 39 when the flapper forms the aforementioned clearances with nozzle 38.

The nozzle 38 has a conical head so that the inner and outer surfaces of the nozzle come to a sharp annular edge shown at 38a (FIG. 2) where the nozzle outlet cooperates with the bottom of the flapper valve. To this end also, the bottom surface of the flapper member is ground off smooth so that the flow of fluid escaping between flapper member 37 and discharge nozzle 38 will vary very closely in accordance with the gap. The flapper 37 and nozzle 38, therefore, together form the bleed valve indicated generally at 5.

Discharge nozzle 38 is disposed in a vertical hole 43 drilled through support block 3. To the lower end of conduit 43 is attached an output pipe 44 which may lead to a dial indicator 44a, which may be calibrated readily to indicate accurately the linear position of rotor 6, i.e. the dial will read in mils, for example, rather than pressure units. Alternatively, output conduit 44 may be attached to a series of pressure switches (not shown) arranged to be tripped at successively higher pressures for various purposes, e.g. initially lighting a warning light or sounding a warning signal and later acting to shut down the turbine if the signal is not needed.

An orifice 45 allows a restricted flow of oil from supply conduit 16 into the pressure chamber 43. Thus there will be a pressure drop across orifice 45, and the pressure established by bleed valve 5 in conduit 43 will be communicated to the signal conduit 44 and the indicating means 44a. It will be understood that pipe 44 is merely a "pressure tap," and no significant flow takes place therethrough. The fluid supplied through orifice 45 will escape through the bleed valve 5 which is defined between the lower surface of flapper member 37 and discharge nozzle 38.

In order to appreciate the manner in which the device operates to get an accurate linear indication of rotor movement, it is necessary to note that the discharge opening through which the fluid is discharged from bleed valve 5 is an annular area having a diameter equal to that of the sharp edge 38a of the discharge nozzle and having a substantially constant height equal to the clearance between the flapper member and the discharge edge 38a. The gap, which is shown more clearly in FIG. 2 at 47 and which is exaggerated for purposes of explanation, is of course a result of the equilibrium position of flapper 37, as determined by the force on the underside exerted by the fluid escaping from nozzle 38 and the force exerted on the upper side by the compression spring 39. A very small shift in the equilibrium position of flapper member 37 will substantially affect the signal pressure in conduit 44. For instance, the total movement of flapper 37 at the location of nozzle 38 may be only .003 inch. Thus a change in length of the compression spring 39 caused by movement of lever 22 will establish a new equilibrium position for flapper member 37 and result in a new signal pressure which is manifested in conduit 44.

The use of a force balance system, through spring 39, is to be particularly noted. A motion of the rotor collar 6a results in a change in force applied to spring 39, which, in turn, causes a change in position of flapper 37. Since the system of forces must be in equilibrium, a given oil pressure $P$ on the bottom side of flapper 37, over an area $A$ bounded by the projection of the circular edge 38a on flapper 37 causes a force $P \times A$ which must equal the force exerted by spring 39 plus the weight of spring and flapper and appropriate associated parts. These weights are fixed and do not participate in changes of force in the system. Since the area $A$ is fixed, the pressure $P$ must vary directly with force imposed. Thus the pressure measured is a nearly exact measure of distance moved by the rotor.

In arrangements, such as that of the aforementioned U.S. Patent 2,888,023, the motion is sensed directly by the motion of the sensing pilot valve, and pressure modulation caused by such motion is directly affected by supply fluid pressure and viscosity and by the manufacturing tolerances used in making the parts so that consistency of performance may be affected markedly by factors other than the motion to be measured.

With the arrangement described herein, it is possible, by varying the ratio of lever 22 and the diameter of nozzle edge 38a to cause a considerable variation in the amount of pressure change in conduit 43 per unit of motion of collar 6a. In practice it has been relatively easy to adjust very precisely to obtain 2 p.s.i. pressure change at gage 44a for each .001 inch axial movement of rotor 6.

The operation of the thrust bearing wear indicator will now be described. Hydraulic fluid at a supply pressure which may be on the order of 100 p.s.i. is introduced to the supply conduit 16 and enters the rotor follower chambers 13, 14 and discharges through probe 7 by way of the gap between probe tip 7a and rotor flange 6a. An equilibrium position is maintained by the follower 1 due to the differential pressure acting on the top and bottom sides of piston 8. Movement of rotor 6 axially transiently destroys the pressure equilibrium and causes the follower to take a new position. The follower 1, therefore, takes a position to give a linear indication of the position of rotor 6, which is communicated to the left-hand end of lever 22. As the lever 22 pivots in accordance with the movement of rotor 6, it will change the force exerted on flapper member 37 by compression spring 39. Since the spring constant is known, a known linear movement of the left-hand end of lever 22 will change the force on flapper member 37 by a known amount. For example, if the left-hand end of lever 32 moves upward one tenth of an inch and if the mechanical advantage of lever 22 is such that the right-hand end moves downward two tenths of an inch, and if a spring gradient of 150 pounds per inch is selected, the change of two tenths of an inch in the right-hand end of lever 22 will vary the force on the flapper member 37 by 30 pounds. A corresponding slight closing of the gap 47, without any substantial change in the flow discharge characteristics of the bleed valve 5, results in a signal pressure being communicated to conduit 44 which is substantially linear with the movement of rotor 6. With the arrangement described, only a .001 inch movement of the rotor flange 6a will cause a change in pressure of 2 p.s.i. on indicator 44a.

By use of the hydraulically positioned rotor follower 1, there are no parts rubbed by the rotor flange 6a and therefore subject to wear. Moreover, the compression spring 39 provides a safety device to prevent mechanical damage in case of excessive movement of rotor 6 since it will absorb any "overtravel" of lever 22, and thus prevent damage to the bleed valve 5. The device allows the use of a single source of hydraulic operating fluid to both position the rotor follower and to provide the output signal indicating the axial position of rotor 6. Moreover, a substantially linear relationship is had between the axial movement of rotor 6 and the signal pressure due to the fact that any inaccuracies in the system are of a very small magnitude and do not provide a substantial source of error. The force capability of piston 8 is much greater than that of spring 39, so that the effect of the spring on the position of piston 8 following the rotor movement is inconsequential. The use of a small bleed valve gap as determined by the bias of spring 39 removes one of the primary inaccuracies of many prior art devices.

While there has been described what is at present considered to be the preferred embodiment of the invention, it will be understood that various modifications may be made therein, and it is intended to cover in the appended claims all such modifications as fall within the true spirit and scope of the invention.

What I claim as new and desire to secure by Letters Patent of the United States is:

1. A bearing wear indicator for a rotor supported by bearing means including at least one thrust bearing and subject to axial movement upon wear of a thrust bearing, comprising a source of fluid under pressure, hydraulically positioned means connected to said pressure source and actuated by the fluid for non-engagingly following the axial movement of the rotor, bleed valve means connected to said pressure source and including a movable lever portion disposed to adjust the bleed gap, spring means having a known spring constant biasing said movable lever portion against the pressure of the fluid issuing from said bleed valve means, linkage means connected between said hydraulically positioned means and said spring means causing the hydraulically positioned means to adjust the force exerted by the spring means on the lever portion linearly with respect to the movement of the hydraulically positioned means, and hydraulically actuated indicator means connected to the bleed valve means and responsive to the pressure therein, whereby axial rotor movement will actuate the indicator means to furnish a hydraulic pressure signal varying substantially linearly with rotor axial movement.

2. A wear indicator for a rotor having thrust bearings and subject to axial movement upon wear of the thrust bearings, comprising a source of fluid under pressure, hydraulically positioned means connected to said pressure source and actuated by the fluid for non-engagingly following the axial movement of the rotor, nozzle means connected to said pressure source defining a sharp annular edge at the nozzle outlet, pivoted flapper means defining a smooth flat surface arranged in juxtaposition with said nozzle annular edge to define therewith an adjustable annular bleed gap, spring means having a known spring constant biasing said pivoted flapper means against the pressure of the fluid issuing from said nozzle means, linkage means connected between said hydraulically positioned means and said spring means causing the hydraulically positioned means to adjust the force exerted by the spring means on the pivoted flapper means linearly with respect to the movement of the hydraulically positioned means, and hydraulically actuated indicator means connected with the nozzle means and the pressure source, whereby axial rotor movement will actuate said indicator means to furnish a hydraulic pressure signal varying substantially linearly with axial rotor movement.

3. A wear indicator for a rotor having thrust bearings and subject to axial movement upon wear of the thrust bearings, comprising a source of fluid under pressure, a stationary support block, hydraulically positioned means slidably mounted in said support block and connected to said pressure source for non-engagingly following the axial movement of the rotor, stationary nozzle means disposed on the support block and connected to the pressure source, said nozzle means defining a sharp annular edge at the nozzle outlet, flapper means pivotally mounted on said support block and defining a smooth flat surface arranged in juxtaposition with said nozzle annular edge to define an annular bleed gap therewith, compression spring means having a known spring constant disposed on the opposite side of said flapper means from said nozzle means biasing said flapper means against the fluid issuing from the nozzle means, lever means pivotally mounted on the support block including a first end portion engaging on the hydraulically positioned means and a second end portion engaging the spring means, whereby movement of the hydraulically positioned means will adjust the bias of the compression spring means against the flapper means, and hydraulically actuated indicator means connected to the nozzle means whereby axial rotor movement will actuate said indicator means to furnish a substantially linearly varying hydraulic pressure signal varying substantially linearly with axial rotor movement.

4. A wear indicator for a rotor having thrust bearings and subject to axial movement upon wear of the thrust bearings, comprising a source of fluid under pressure, support block means defining a cylindrical bore, hydraulically positioned means including fluid pressure actuated piston means slidable in said bore and connected to said pressure source following the axial movement of the rotor, nozzle means disposed on the support block and connected to the pressure source, said nozzle means including a projecting hollow frusto-conical portion terminating in a sharp annular edge at the nozzle outlet, a flapper means pivotally mounted on the support block defining a smooth flat surface arranged in juxtaposition and forming close clearances with said nozzle annular edge to define therewith an adjustable annular bleed gap, compression spring means having a known spring constant disposed on the opposite side of said flapper means from the nozzle means and biasing said flapper means against the fluid issuing from the nozzle means, lever means pivotally mounted on the support block and including a first end portion engaging said piston means and a second end portion engaging said compression spring means, whereby movement of the piston means will adjust the bias of the compression spring means against the flapper means, and hydraulically actuated indicator means connected to the nozzle means and the pressure source, said indicator means being calibrated to indicate rotor axial displacement, whereby axial rotor movement will be amplified and remotely indicated in a substantially linear relationship by the indicator means.

References Cited in the file of this patent
UNITED STATES PATENTS
2,888,023     Eggenberger ------------ May 26, 1959
FOREIGN PATENTS
701,530     Great Britain ------------ Dec. 30, 1953